W. R. Nevins,
Cracker Machine,
N° 2,344.    Patented Nov. 10, 1841.
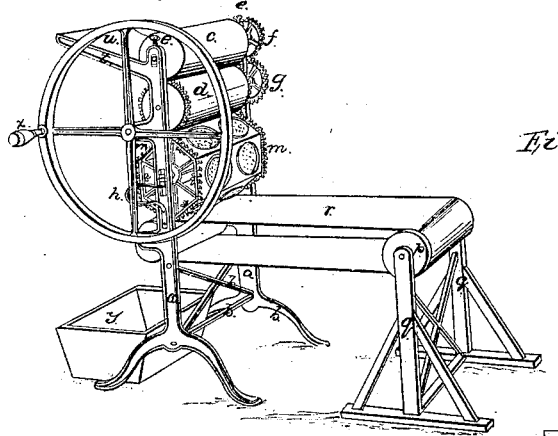
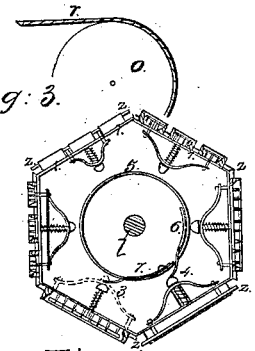
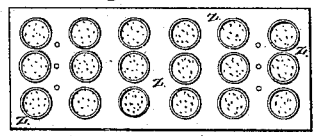
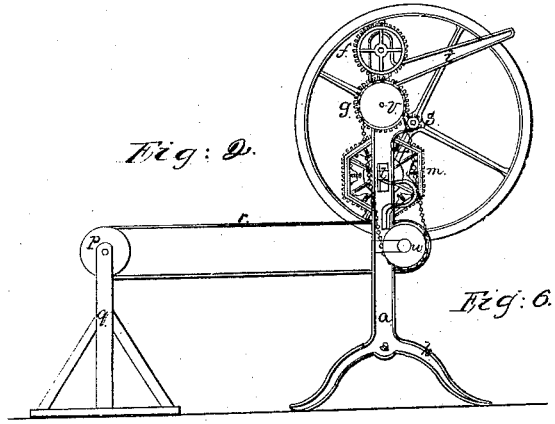
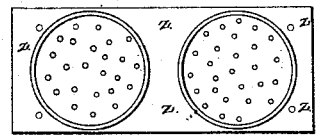
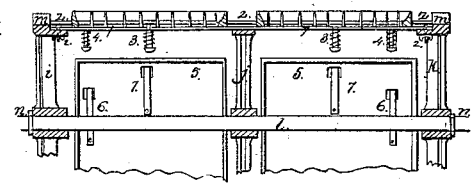

UNITED STATES PATENT OFFICE.

WM. R. NEVINS, OF NEW YORK, N. Y.

MACHINE FOR CUTTING CRACKERS.

Specification of Letters Patent No. 2,344, dated November 10, 1841.

*To all whom it may concern:*

Be it known that I, WILLIAM R. NEVINS, of the city, county, and State of New York, have invented a new and useful Improvement in Machines for Making Ship-Bread, Crackers, Biscuit, &c., which I style "Nevins' Patent Cracker-Machine"; and I do hereby declare that the following is a full, clear, and exact description of the construction and operation of the same, reference being had to the annexed drawings, making a part of this specification, in which—

Figure 1 is a perspective view; Fig. 2, a side elevation; Fig. 3, an end view of the cutters, as they appear on the hexagon cylinder. Fig. 4, is a plan of one of the surfaces of the hexagon cylinder, having the cutters arranged for crackers, or biscuit. Fig. 5, is a view of the same thing except that the cutters are arranged for ship bread. Fig. 6 is a longitudinal section of the hexagon cylinder, showing the upper half of the section entire, the lower half being broken.

To enable others skilled in the art to make and use my invention, I will proceed to describe more minutely its construction and operations.

I construct a frame of wood, or iron, composed of two vertical posts $a, a$, Fig. 1, of any convenient height; say about 3 feet, more or less. I support them in their places about eighteen inches apart, and parallel to each other, by the braces, and supports shown at $b, b, b$. I then place two cylinders of iron, or other metal, about 5 inches in diameter as shown at $c, d$, having their axes resting in proper boxes in the posts $a, a$. The boxes of the cylinder or roller $c$, are raised or depressed by the screws $e, e$, placed in the top of the posts $a, a$.

$f, g$, are two cog wheels secured to the ends of the axles of the rollers $c$ and $d$. These cog wheels are of equal size, and geared into each other. I then construct a polygonal drum or cylinder, the form I generally use is the six sided or hexagon. The sides of this drum are so arranged as to be parallel to, and be in contact with the cylinder $d$; the axis of this drum does not revolve with the drum. The ends of this axle is fitted nicely into a slant made in the posts $a, a$; and is supported on a strong spring at each end, as shown at $h$. The construction of this drum will be clearly shown at Fig. 6, where $i, j, k$, represents three cast iron vertical, hexagonal frames, placed on the axle $l$, and are so constructed as to revolve freely on the axle. They are kept in their places on the shaft $l$, by the keys $n, n$. The edges of the frames $i$, and $k$, are rabbeted and the projecting edge is formed into a rack, which forms a continuous series of cogs as shown at $m, m$, in Figs. 1, 2, and 6. The cylinder $d$, is furnished with cogs at each end, which gear into the cogs $m, m$, on the hexagon drum.

I then construct two cylinders of wood, as shown at $o, p$, their diameters are equal to the metal rollers $c, d$. The cylinder at $o$, has its journals resting in two projecting pieces affixed to the posts $a, a$, and about 4 inches from the center of said posts. The roller at $p$, is sustained by a wooden frame as shown at $q$; the axles of $o$, and $p$, being parallel to each other, and any distance apart. I then pass an apron, or endless belt of linen cloth, or other flexible material, around the rollers $o, p$, as shown at $r$. The height of the rollers are so arranged as to bring the apron $r$, as close to the hexagon drum as possible, and not touch it.

I then construct a fly wheel about 26 inches diameter, which I affix to an iron axle running parallel to the axis of the cylinder $d$, and directly opposite the lower side of said cylinder The axle of the fly wheel is supported by projecting parts affixed to the posts $a, a$; the end of the axle opposite the fly wheel is furnished with a pinion 2 inches diameter, as shown at $s$, Fig. 2, and is geared into the cog wheel $g$ Figs. 1 and 2. I then affix two pieces to the sides of the posts $a, a$, in a position inclined to the horizon, the lower edges of these pieces to range a little below the junction of the cylinder, $c, d$, as shown at $t$. I then secure a piece of sheet iron to the lower edges of the pieces $t$, as shown at $u$; the lower edge of the sheet iron rests upon the cylinder $d$. The space inclosed by the pieces $t$, and the sheet iron $u$, I call the feeder. I then place a wooden pulley about $4\frac{1}{2}$ inches diameter against the side, and concentric with the cog wheel $g$, as shown at $v$ on Fig. 2. This pulley has an angular groove in its edge. I also place a similar pulley on the end of the journal of the roller $o$, as shown at $w$. I then pass a small endless chain around the pulleys $v$, and $w$.

To operate this machine, a handle is placed at $x$, on the fly wheel, by which the fly wheel is made to revolve, which by the pinions s, Fig. 2, causes the cog wheel g, to revolve, which moves the wheel f, which gives motion to the metal cylinders c, and d; also the cog wheels at each end of the cylinder d, communicates motion by the racks m, m, to the hexagon drum; which vibrates upward, and downward, in the slant by the springs h, as the angles of the hexagon, pass under the roller d; the springs pressing the drum upward with sufficient force, against the lower side of the roller; also the pulley v, by the endless chain, gives motion to the pulley w, and consequently to the cylinders o, and p, and the apron v, therefore the dough when placed upon the feeder at u, the handle x is pressed downward, and motion given in that direction to the fly wheel, carries the dough between the rollers c and d; the thickness being regulated by the screws e, e. The sheet of dough is then continued half around the cylinder d, when it passes between the cylinder d, and the hexagon drum, which is furnished with cutters of the proper size which, pressing against the cylinder d, cuts the biscuit from the sheet of dough as required. The waste is then ejected by the waste follower, (which will be hereafter explained in this specification) and falls into the tray at y. The biscuit is immediately afterward ejected from the cutter, and is lodged upon the apron v.

The operation of the cutters, and the arrangement of them on the hexagon drum, and the method by which the waste, and biscuit, is separately thrown off, or ejected from the drum, is as follows.

Let 1, 1, 1, on Figs. 3, and 6, represent the edges of a plate of sheet iron the size of one of the faces of the drum. These plates are attached to the frames i, k, by the thumb screws 22. I then form my cutters of grass, or other metal, in a circular, or any other form and secure them to the sheet iron 1, 1, 1, by riveting or otherwise; I also place a number of perforators, or punches, within the cutter, and rivet them also to the sheet iron plate 1, 1, 1, the length of the punches being equal to the height of the cutter. I then fit a plate of brass, or other metal within the cutters and perforate it in such a manner that the punches may pass through it freely, and allow the plate to rest upon the sheet irons; this plate I call the biscuit follower or ejector. I then construct a bolt, having a spherical head projecting over the bolt, so as to receive a spiral spring, which surrounds the bolt as shown at 3, 3, 3. This bolt is firmly riveted to the follower, and the spiral spring pressing against the head of the bolt at one end, and the sheet iron plate at the other, keeps the follower close to the bottom of the cutter. The waste follower is a similar piece of metal, which occupies all the space outside the cutters, as shown at 2, 2, 2, on Figs. 3, 4, 5, and 6. A bolt similar to those attached to the biscuit followers with spiral springs, &c., as shown at 4, 4, also keeps the waste follower close to the sheet iron plate 1, 1, 1, &c. I now construct two hollow cylinders of brass or other metal and place them within the hexagon drums, and firmly secured to the shaft of the drum l, as shown at 5, 5, on Figs. 3 and 6. I then place a number of strong springs within the inner surface of these hollow cylinders, and projecting outward, at a certain point, through a rectangular opening in the case for that purpose, as shown at 6, 7, on Figs. 3, and 6. The bolts attached to the followers, as shown at 3, and 4, are of such a length as just to clear the cylinder 5, as they pass around; and when the waste follower 4, comes in contact with the spring 6, the waste is suddenly thrown off; the biscuit follower 3 passes farther on, and then comes in contact with the spring 7, which ejects the biscuit, and it drops upon the apron v. The advantages of this machine are, first, its compact, and convenient form; second, the cutters being placed upon a plane surface, the biscuit leaves the punches readily which is not always the case when the punches are radial, instead of parallel, as in the cylindrical cutters; third, the followers being always kept firmly back, except when in the act of ejecting, there is no chance for the dough to get behind them and clog them up.

What I claim as my invention, and desire to secure by Letters Patent, is—

1. The arrangement of the cutters on a polygonal drum.

2. The spiral springs in combination with the bolts 3, and 4, and the manner in which they are intercepted by the springs 6 and 7, the whole combined substantially as herein set forth.

WM. R. NEVINS.

Witnesses:
JOHN M. VANORSDEL,
ALFRED C. LONGMORE.